Patented Nov. 22, 1932

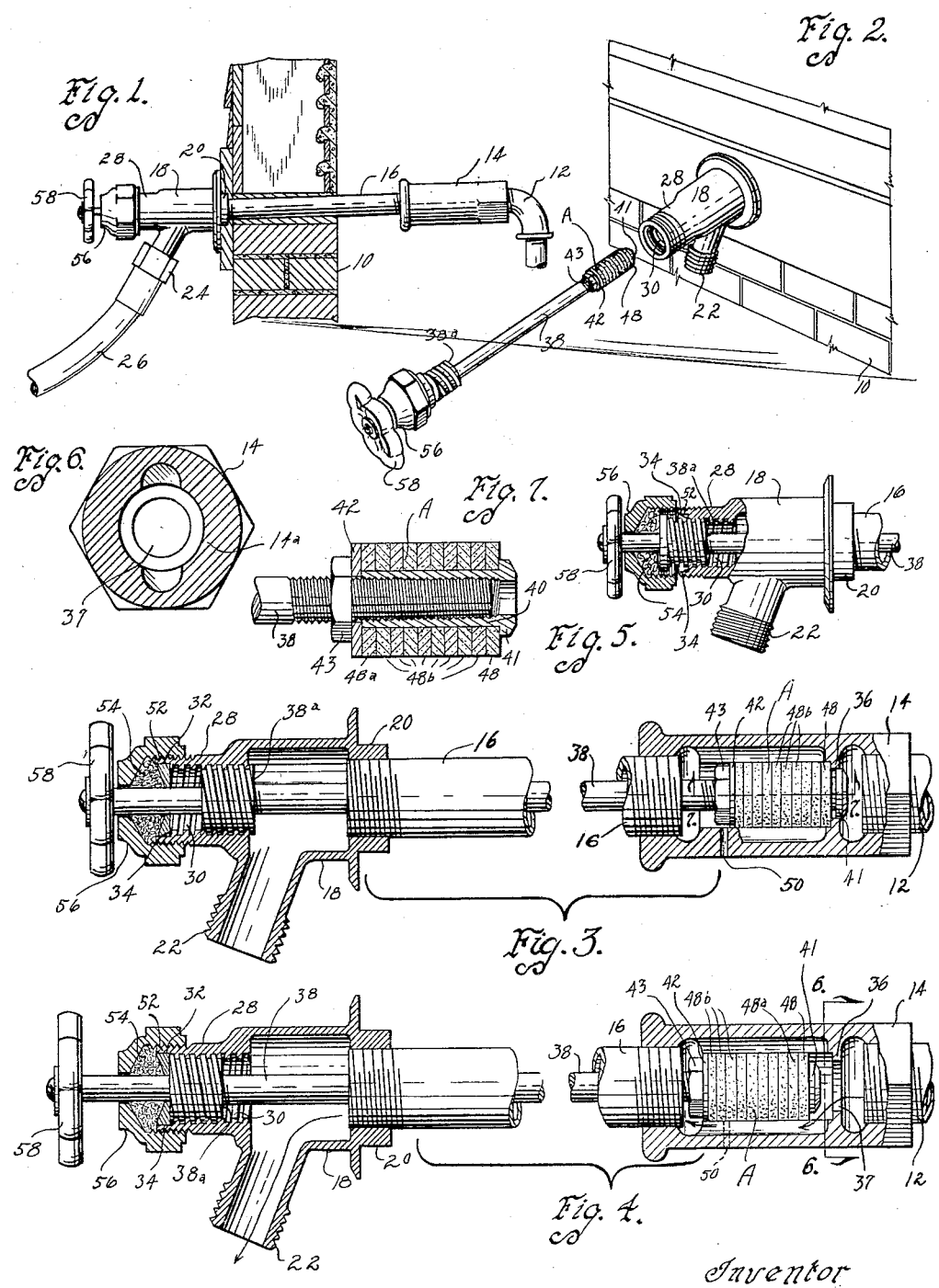

1,888,359

UNITED STATES PATENT OFFICE

THOMAS RITCHIE, OF MARSHALLTOWN, IOWA, ASSIGNOR TO RITCHIE MANUFACTURING COMPANY, OF MARSHALLTOWN, IOWA, A CORPORATION OF IOWA

WALL HYDRANT

Application filed December 23, 1929. Serial No. 416,154.

The object of my invention is to provide a wall hydrant of the kind used in the walls of a building, of simple, durable and inexpensive construction.

More particularly, it is my purpose to provide such a wall hydrant having parts so constructed and arranged as to provide for the location of a valve inside the building where it will not be exposed to out-door weather conditions and to provide means outside the building for controlling it, and also means outside the building whereby the valve may be removed for renewing the gasket thereon without the necessity for taking out the piping, and with a minimum of labor.

A further object is to provide an improved gasket washer construction including a plurality of gasket washers serving to guide a movable portion of the valve and adapted to facilitate renewal of the gasket washers by substituting one of the unused washers for the one which has previously been contacting with a valve seat.

Another object is to provide such a gasket washer construction adapted to prevent damage to the gasket washer when the hydrant is screwed down tightly.

With these and other objects in view, my invention consists in the construction, arrangement and combination of the various parts of my wall hydrant, whereby the objects contemplated are attained, as hereinafter more fully set forth, pointed out in my claims, and illustrated in the accompanying drawing, in which:

Figure 1 shows a side elevation of a wall hydrant embodying my invention.

Figure 2 shows a perspective view of the same with the valve removed from the pipe.

Figure 3 is a side elevation of the wall hydrant, parts being shown in section and parts being broken away, with the valve closed.

Figure 4 shows a similar view with the valve open.

Figure 5 is a side elevation of a portion of the wall hydrant structure, parts being shown in section and parts being broken away, illustrating the position assumed by certain parts during the removal of the valve.

Figure 6 is a detail sectional view taken on the line 6—6 of Figure 4; and

Figure 7 is an enlarged sectional view through the gasket washer assembly.

Difficulties have existed in providing a wall hydrant for mounting in the side walls of buildings in which the valve is located inside the building in such a way that the valve may be removed for renewing the gasket thereon without considerable labor in disconnecting the pipe and may yet be actuated and controlled from outside the building.

It is common to put the entire valve structure outside the building, which is not desirable because the water may then freeze up in the pipe adjacent the outer surface of the building wall.

When the valve is placed inside the building and connected with a rod for operation from the outside, the valve is ordinarily arranged to seat by movement toward the outside of the building and cannot be taken out from outside the building. In such cases, it is necessary to disconnect the pipes on the inside of the building to get at the valve. This is desirable because the gasket on the valve needs renewing at fairly frequent intervals.

It is my purpose to provide a wall hydrant whereby these difficulties are eliminated.

I have shown my wall hydrant installed in a wall indicated generally by the reference numeral 10. The water supply pipe on the inside of the building is indicated at 12.

A valve casing 14 has a threaded connection with the pipe 12. A short pipe 16 has a threaded connection with the other end of the casing 14 and extends through the wall 10 as shown for instance in Figure 1, and has a threaded connection at its outer end with a fitting 18. The fitting 18 has at its inner end a threaded sleeve 20 shown in Figure 5 screwed onto the pipe 16. The fitting 18 also has a tubular extension 22 extending downwardly from its hollow interior and adapted to receive the nut 24 on the end of a hose 26.

The fitting 18 has at its outer end an interiorly threaded portion 28 aligned with the sleeve 20 as shown in Figure 3. The threads 30 extend from the inner end of the portion 28 toward the outer end thereof and terminate short of such outer end. The outer portion of the sleeve part 28 has its interior bore of slightly larger diameter than the threaded portion thereof as indicated at 32 for thus forming a shoulder 34, the purpose of which will be later explained.

In the casing 14 is an annular valve seat 36 having a central bore or hole 37.

Extending through the fitting 18, the pipe 16 and part way through the casing 14 is a valve stem rod 38 on the inner end of which is mounted a valve A for coacting with the seat 36.

The valve A consists of a sleeve 40 having an annular flange 41 at one end thereof. A screw threaded opening is provided within the sleeve 40 and terminates short of the end thereof. The valve rod 38 is screwed as far into the sleeve 40 as it will go so that its end will bind where the threads of the sleeve stop to prevent relative movement of the sleeve 40 and the rod 38 after once being assembled. Gasket washers 48 and 48a with intermediate gasket washers 48b are mounted on the sleeve 40. These washers are of any suitable composition, such as leather soaked in linseed oil. They are held in position on the sleeve 40 by a metal washer 42 and a lock nut 43. It will be noted by referring to Figure 7 that the washer 42 contacts with the end of the sleeve 40 opposite the flange 41. The aggregate length of the gasket washers 48, 48a, and 48b, when placed on the sleeve 40 should be slightly longer than the distance between the flange 41 and washer 42 when the washer is forced against the sleeve 40 by the nut 43 so that when the valve A is assembled the gasket washers are somewhat compressed although not enough to prevent them from being turned on the sleeve 40, the purpose of which will be hereinafter disclosed.

Near the outer end of the stem 38 is an enlarged portion 38a threaded to coact with the threads 30 in the sleeve-like portion 28 of the fitting 18. Seated against the shoulder 34 is a collar 52, the outer face of which is concave.

Adjacent the concave face of the collar 52, is suitable packing 54. For tightening the packing against the collar and pressing the collar 52 against the shoulder 34, I provide an interiorly screw threaded cap 56 through which the stem 38 extends.

The stem 38 is provided on its outer end with a hand wheel 58.

The pipe 16 is so installed as to be inclined from its inner end downwardly so that when the wall hydrant is closed, water may be drained away from the valve A and out of the pipe 16 through the tubular extension 22, which is located at the bottom of the fitting 18, at the outer end of the pipe 16.

In the ordinary use of the wall hydrant, it will be seen that when the hand wheel 58 is operated to rotate the enlarged threaded portion 38a of the rod 38 for moving the parts inwardly, the valve A may be seated with the gasket 48 against the seat 36.

The position of the parts just described is shown in Figure 3.

When the hand wheel 58 is rotated in the opposite direction, the stem 38 and the valve will be moved to valve opening position as shown in Figure 4.

If the gasket 48 becomes worn and it is desired to renew it, this can be done by a very simple operation and without disconnecting the pipes on the interior of the building.

The cap 56 is unscrewed until it is free from the sleeve-like portion 28 of the fitting 18 as shown in Figure 5. The hand wheel 58 can then be rotated for screwing the portion 38a and the valve stem outwardly until the portion 38a engages the collar 34. The rotation of the hand wheel 58 is then continued.

The portion 38a will force the collar 34 and the packing 54 outwardly.

There is thus provided a simple method of removing the collar 52.

The valve may then be pulled out and the gasket washers 48, 48a and 48b slid back on the rod 38 after the washer 42 and the lock nut 43 have been loosened. The sleeve 40 may then be removed from the rod 38 and the washer 48a placed in position between the washer 48 and the flange 41. Thus an unused gasket washer is substituted for the one that has been contacting with the valve seat 36 and when one washer gives four or five years' service the plurality of ten washers for instance would give forty or fifty years service without the necessity of having to make or purchase a new gasket washer each time the old one becomes worn. The parts of the valve A are then reassembled and may be quickly and easily restored to operating position.

In Figure 2, I have shown the valve removed from the pipe 16 and fitting 18.

It will thus be seen that I have provided a wall hydrant having the advantages heretofore mentioned. The valve is arranged on the inside of the building so that in cold weather there will be no water in the pipe 16 or in the fitting 18, and the danger of freezing water therein is avoided. The valve can be removed for renewing its gasket by manipulating parts outside the building.

As shown in Figure 3 the handle 58 might be turned to such a degree as to compress the stack of gasket washers 48, 48a and 48b when excessive rotating pressure is applied thereto. This does not damage the gasket washers 48, however, because of the gasket washers being designed to rotate on the sleeve 40 in the event of such pressure being applied to the handle 58. In other words the gasket washer 48 will remain stationary on the seat 36 instead of being rotated and possibly damaged.

It will be noted that the flange 41 is substantially the same size as the opening 37 so as to prevent any part of the gasket washer from being squeezed down between the flange 41 and the interior edge of the valve seat 36. Besides forming a substantial guide for the valve A the gasket washers 48 may serve to close a drain opening 50, shown in Figure 3, when the valve is in opened position as illustrated in Figure 4. This drain opening will allow any water in the fitting 14 to drain out of the fitting when the valve is closed. In most types of installations, however, the opening 50 is not required.

The parts are of simple and inexpensive construction.

Changes may be made in the construction of parts and the details of their arrangement without departing from the real spirit and purpose of my invention, and it is my intention to cover by my claims any modified forms of structure or use of mechanical equivalents, which may be reasonably included within their scope.

I claim as my invention:

1. In a hydrant construction, a valve body having a valve seat, a valve for coaction therewith and including a stem and a sleeve member threaded thereon having a flange on one end thereof to extend into the opening of said valve seat and a plurality of gaskets on said sleeve member.

2. In a hydrant construction, a valve body having a valve seat, a valve for coaction therewith and including a stem and a sleeve member mounted on the stem having a flange on one end thereof to extend into said valve seat, a plurality of gaskets on said sleeve member, and a washer contacting with the end of said sleeve member opposite said flange.

3. In a hydrant construction, a valve body having a valve seat, a valve for coaction therewith and including a valve rod, a sleeve and a washer thereon, said washer being positioned against one end of said sleeve, a flange on the other end of said sleeve and a plurality of gasket washers on said sleeve between said flange and said washer.

THOMAS RITCHIE.